Jan. 7, 1969   D. U. HOWARD   3,420,477
INTEGRAL FUEL TANK
Original Filed Sept. 13, 1965
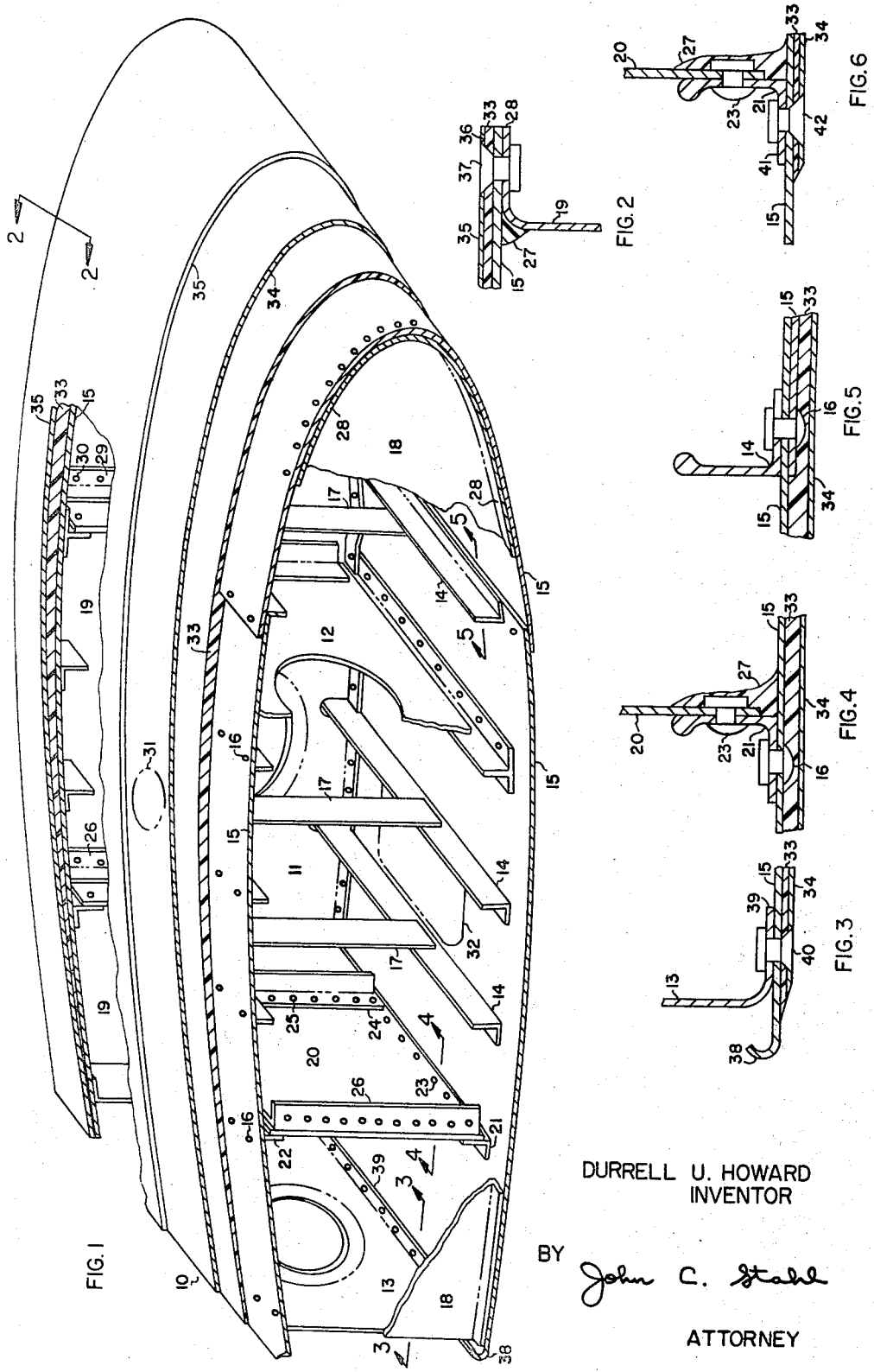
DURRELL U. HOWARD
INVENTOR
BY *John C. Stahl*
ATTORNEY

United States Patent Office 3,420,477
Patented Jan. 7, 1969

3,420,477
INTEGRAL FUEL TANK
Durrell U. Howard, 306 Krameria Drive,
San Antonio, Tex. 78213
Continuation of application Ser. No. 486,801, Sept. 13,
1965. This application June 5, 1967, Ser. No. 652,367
U.S. Cl. 244—135                5 Claims
Int. Cl. B64d 37/04; B64c 3/34

ABSTRACT OF THE DISCLOSURE

An integral fuel tank for aircraft comprising a tank of desired configuration and capacity constructed in the wing of the said aircraft utilizing the supporing structure thereof; the inboard, outboard, and rear closure members are secured to the said supporting structure and sealed inside the wing; at least one sheet of flexible material is laminated to the outer surface of the skin of the wing panel and extends outwardly of the limits of the fuel tank thus formed, not only effectively sealing the fuel tank but also improving the aerodynamic performance of the wing.

---

The subject application is a continuation of application Ser. No. 486,801, filed Sept. 13, 1965, now abandoned. The present invention relates to an integral fuel tank for aircraft more particularly to the exterior sealing of portions of such fuel tank by laminating materials to the corresponding outer surfaces of the wing panel.

Although aircraft have heretofore been modified to include an integral fuel tank in the wing panels, it has been the general practice to completely rebuild such wing panels, wherein all sealing operations were internal. The present invention relates to a novel process wherein an integral fuel tank is formed in accordance with conventional practices and portions of the said fuel tank are subsequently sealed by laminating or bonding an additional sheet or sheets of material, or molding a material, to the corresponding outer surfaces of the wing panel; not only is the fuel tank thus formed effectively sealed in a simple manner, but also the aerodynamic characteristics of the wing are improved as a result of covering the rivet heads and other protuberances normally encountered on the outer surface of such wing panel.

An object of the present invention is the provision of a method of sealing an integral fuel tank in the wing panel of an aircraft which otherwise could not effectively be sealed.

Another object is to provide means to construct an integral fuel tank with a minimum of effort and without costly and time consuming operations in limited working spaces inside an aircraft wing.

A further object of the invention is the provision of such a method which not only seals portions of the fuel tank but also improves the aerodynamic performance of the wing.

Still another object is the provision of such a fuel tank which is relatively inexpensive to construct as compared with conventional practices.

Other objects and features of the invention will become apparent to those skilled in the art as the disclosure is made in the following detailed description of preferred embodiments of the invention as illustrated in the accompanying sheet of drawing in which:

FIG. 1 is a fragmentary isometric view, partly broken away and partly in section, showing the integral fuel tank of the subject invention.

FIG. 2 shows a section of the device taken on the line 2—2 of FIG. 1 looking in the direction of the arrows.

FIG. 3 shows a section of the device taken on a line 3—3 of FIG. 1 looking in the direction of the arrows.

FIG. 4 shows a section of the device taken on a line 4—4 of FIG. 1 looking in the direction of the arrows.

FIG. 5 shows a section of the device taken on the line 5—5 of FIG. 1 looking in the direction of the arrows.

FIG. 6 shows a section of a modification of the device taken on the line 4—4 of FIG. 1 looking in the direction of the arrows.

Referring now to the drawings, wherein like reference characters designate like or corresponding parts throughout the several views, there is shown in FIG. 1 a wing panel 10 of an existing aircraft which is to be modified to include the integral fuel tank of the subject invention.

More particularly, such wing panel 10 normally includes a plurality of longitudinally and vertically extending ribs 11, a transversely and vertically extending main spar 12, a transversely and vertically extending rear spar 13, and a plurality of transversely extending stringers, indicated generally by 14, to which supporting structure the skin 15 is attached as by rivets 16 or the like. In the practice of the subject invention it may be necessary to reinforce the internal structure of the wing panel heretofore described as by means of vertically extending tension ties 17 or the like, connected to vertically aligned strangers; such strengthening of the wing panel is often required in view of the additional load placed upon such wing panel by the fuel carried in such fuel tanks. It is to be understood that all internal modifications to the wing panel are in accordance with conventional techniques which conform with the requirements of the Federal Aviation Agency. Preferably the existing structural members in the said wing are to be utilized wherever practicable and the inboard, outboard, and rear closure members 18–20, respectively, hereinafter to be described, secured to such supporting structure. Alternatively, additional structural members may be supplied and the aforementioned closure members 18–20 secured thereto.

Referring now to FIGS. 1 and 4 of the drawings, the transversely and vertically extending rear closure member 20 is constructed of aluminum or other light weight metal and is secured along the upper and lower edges to vertically aligned stringers 21–22 as by rivets 23 or other securing means. Spaced, vertically extending angles 24, to which rear closure 20 is attached by rivets 25, is secured to the vertically extending legs of the respective stringers 21, 22 while a vertically extending angle 26 is secured to each lateral end of closure member 20; the inboard and outboard closure members 18, 19 are secured to angles 26 in a manner hereinafter to be described.

As best seen in FIG. 4, a sealant 27 is provided in all interior angles formed between the skin 15 and the rear closure member 20 as well as around the portion of each rivet relative thereto extending inwardly into the tank and in the gap formed between the upper and lower edges of closure member 20 and the skin 15, to form a leak-proof joint. Sealants which qualify under military specifications Mil-S-8802 and more particularly PR–1422 A–2 and PR–1422 B–2, manufactured by Products Research Company of Burbank, Calif., provide effective seals.

Referring now to FIGS. 1 and 2 of the drawings, both inboard and outboard closure members 18, 19 include a perpendicularly outward extending flange 28 around the periphery of each closure member except for the rear end thereof, which flange is attached to the corresponding portions of the skin 15 as will hereinafter be more fully described in connection with FIG. 2. Additional support for the medial portion of closure members 18, 19 may be provided by means of a vertically extending angle 29 which connects at each end to selected stringers and the said closure members 18, 19 secured thereto by means of rivets 30 or the like. The rear ends of closure members 18, 19 are secured to angles 26 in a conventional manner. Sealant 27 is also applied to the interior angles of the fuel tank between the inboard and outboard closure members and the skin 15 and around all portions of rivets or other securing means relative thereto extending into the inside of the tank; it is understood that all lap joints and the respective securing means between sheets of the original skin of the wing panel will be sealed in a manner hereinafter to be described.

An opening 31 for fuel is normally provided in the upper wing surface in proximity to the outboard closure member 19, while in access or inspection port 32, illustrated in reference lines in FIG. 1, may be provided in the under surface of the wing panel, as by conventional practices.

When jet fuels are to be utilized, the interior of the fuel tank thus formed is first anodized or given a chemical coating such as "Iridite" and then sprayed with a protective coating such as PR-1560, manufactured by Products Research Company of Burbank, Calif., such protective coating is a two-part urethane which is applied before sealing to prevent corrosion.

After the integral fuel tank has been completed in accordance with the principles heretofore described, the outer surface of skin 15 is degreased as by vapor degreasing with trichloroethylene followed by sandblasting, or preferably, by chemical etching. A sealant-adhesive 33, such as fulfills the requirements of military specifications Mil-S-8802, or a two-part adhesive, manufactured by Shell Chemical Company of Pittsburg, Calif., and identified as "EPON" 913, 919, 933 and 934, or equivalents thereto, is applied in an even coating of any desired thickness ranging from 0.025" to 0.125" over the outer surface of skin 15, and a sheet 34 of a lightweight metal, such as aluminum, magnesium, or titanium, or sheet plastic, "Fiberglas," or the like, bonded thereto. The temperature and time required to cure such sealant-adhesive 33, or adhesive, as well as the pressure to be applied to sheet 34, is set forth in the manufacturer's specifications for each such product. Adjacent, longitudinally extending sheets, indicated generally by 34-35, may be lapped approximately three inches; the overlapping areas are first thoroughly degreased as by methods which produce a breakfree water film on metal surfaces, and an epoxy adhesive such as EC-2216-B/A manufactured by Minnesota Mining and Mfg. Co. applied between such lap joint and the recommended pressure applied to keep adjacent sheets in alignment. The longitudinally extending sheets are applied to skin 15 in such a manner that they extend laterally beyond the respective inboard and outboard closure members of such fuel tank; if desired, such sheets may be extended laterally to the root and tip of the wing panel for aerodynamic purposes. As best seen in FIG. 2 of the drawings, a countersink 36 is provided through sheet 35 and sealant-adhesive 33, respectively, and a rivet 37 passed into the flange 28 of the closure member 19 and expanded.

A single, longitudinally extending sheet may be wrapped around and bonded to the upper surface, leading edge and lower surface of a wing panel; alternatively, a plurality of longitudinally extending sheets may be lapped at any desired point on the wing panel and the epoxy adhesive EC-2216-B/A, or equivalent, applied therebetween. In either case, however, the sheets 34, 35 terminate rearwardly of rear closure member 20 and are bonded to both the upper and lower surfaces, respectively, of skin 15. As shown in FIG. 3, the end of skin 15 on the lower surface of the wing panel may be rolled, indicated by reference numeral 38. The end of sheet 34 terminates forward of such rolled portion 38 and is secured to flange 39 of the rear spar 13 by means of rivets 40 or the like. In a modification of the invention, illustrated in FIG. 6, sheet 34 terminates rearward of rear closure member 20 and is secured to the horizontal leg 41 of stringer 21 by means of rivet 42 or the like which passes therethrough.

In FIG. 5 of the drawings there is shown a lapping of the skin 15 with a rivet 16 passing upwardly through the stringer 14. The sealant-adhesive 33 not only provides an effective seal on the outer surface of the skin for such type lap joint but also sheet 34 when applied thereto covers the protruding rivet heads and the like, enhancing the aerodynamic smoothness of such wing panel.

It is to be understood that a sealant-adhesive such as PR-1422 A-2 or PR-1422 B-2, heretofore mentioned, or other sealant satisfying the requirements of military specification Mil-S-8802 may first be applied to the outer surface of skin 15 and permitted to dry; a two-part epoxy void filler of low specific gravity may then be applied to the sealant and the outer skin bonded thereto in the manner heretofore described.

It is well known that in the conventional construction of an aircraft wing panel the skin 15, as such, is often insufficiently thick to provide the necessary strength for such integral fuel tank; the outer skin in combination with the sealant-adhesive and/or void filler of the subject invention not only provides the additional strength required, but also provides a positive seal for such integral fuel tank and additionally improves the aerodynamic characteristics of the wing panel by covering the rivet heads and other projections, dents and other irregularities.

What is claimed is:

1. In an aircraft wing including a supporting structure consisting of ribs, spars, stringers and skin secured to said supporting structure, in integral fuel tank, said tank consisting of inboard and outboard closure members and a rear closure member, said closure members secured to said supporting structure, sealing means between said rear closure member and the inboard and outboard closure members respectively, sealing means between said closure members and the corresponding portions of the skin, a composition having sealing and adhesive properties applied on the outer surface of the skin of said wing, a sheet material applied on said composition, said material extending beyond the respective closure members.

2. In an aircraft wing including a supporting structure consisting of ribs, spars, stringers and skin secured to said supporting structure, an integral fuel tank, said tank consisting of inboard and outboard closure members and a rear closure member, said closure members secured to said supporting structure, sealing means applied between said rear closure member and the inboard and outboard closure members and between said closure members and the corresponding portions of the skin, a sealant applied on the outer surface of the skin of said wing, an adhesive applied on said sealant, a lightweight sheet material applied on said adhesive, said material extending beyond the respective closure members, and means securing said material to said supporting structure.

3. In an aircraft wing including a supporting structure consisting of ribs, spars, stringers and skin secured to said supporting structure, an integral fuel tank, said tank consisting of inboard and outboard closure members and a rear closure member, sealing means between said rear closure member and the inboard and outboard closure members and between said closure members and the corresponding portions of the skin, a sealant applied on the outer surface of the skin of said wing, an adhesive applied on said sealant, a plurality of overlapped sheets of light weight material applied on said adhesive and bonded to said wing, a second adhesive applied between said overlapped sheets, and means securing the outermost sheets of said plurality of sheets to said supporting structure.

4. In an aircraft wing structure, an integral fuel tank wherein the upper and lower surfaces and leading edge of said wing form portions of said tank, said tank sealed on the respective outer surfaces of said wing comprising a sealant applied on the outer surfaces of said wing and extending beyond the corresponding limits of said fuel tank, an adhesive applied on said sealant, and a lightweight sheet material applied thereon.

5. The invention of claim 4 wherein said sheet material is selected from the group consisting of aluminum, magnesium, titanium and plastic.

References Cited

UNITED STATES PATENTS

| | | | |
|---|---|---|---|
| 1,969,200 | 8/1934 | Bellanca | 244—135 |
| 2,155,931 | 4/1939 | Daneman | 244—133 |
| 2,167,972 | 8/1939 | Crawford | 244—133 X |
| 2,208,619 | 7/1940 | Armor et al. | 244—133 X |
| 2,322,104 | 6/1943 | Arcier | 244—135 |
| 3,058,704 | 10/1962 | Bergstedt | 244—133 X |
| 3,140,846 | 7/1964 | Lott | 244—133 |

FOREIGN PATENTS

| | | |
|---|---|---|
| 545,504 | 5/1942 | Great Britain. |
| 644,181 | 10/1950 | Great Britain. |

OTHER REFERENCES

Delmonte, J., The Technology of Adhesives, Reinhold Publishing Corp., 1947 (p. 326).

MILTON BUCHLER, *Primary Examiner.*

J. PITTENGER, *Assistant Examiner.*

U.S. Cl. X.R.

244—129, 133